United States Patent [19]

Gaku et al.

[11] Patent Number: 4,785,034
[45] Date of Patent: Nov. 15, 1988

[54] POLYOLEFIN RESIN COMPOSITION

[75] Inventors: Morio Gaku, Saitama; Hidenori Kimbara, Tokyo; Akira Yahagi, Saitama; Takaaki Osanai, Tokyo, all of Japan

[73] Assignees: Mitsubishi Gas Chemical Company, Inc.; Dainichiseika Color & Chemicals Mfg. Co. Ltd., both of Tokyo, Japan

[21] Appl. No.: 22,054

[22] Filed: Mar. 3, 1987

[30] Foreign Application Priority Data

Mar. 3, 1986 [JP] Japan ................................. 61-44072

[51] Int. Cl.$^4$ ............................................. C08K 5/16
[52] U.S. Cl. ...................................... 524/99; 524/102; 524/103; 524/141; 524/171; 524/186; 524/243
[58] Field of Search ............... 524/205, 206, 207, 208, 524/209, 99, 102, 103, 141, 171, 186, 243, 246

[56] References Cited

U.S. PATENT DOCUMENTS

| | | | |
|---|---|---|---|
| 3,383,359 | 5/1968 | Weitzel et al. | 560/301 |
| 3,403,128 | 9/1968 | Berndt et al. | 528/165 |
| 3,448,079 | 10/1979 | Grigat et al. | 560/301 |
| 3,553,244 | 1/1979 | Grigat et al. | 560/301 |
| 3,595,900 | 7/1971 | Loudas et al. | 560/301 |
| 3,694,410 | 9/1972 | Oehmke | 528/172 |
| 3,994,949 | 11/1976 | Meyer et al. | 560/301 |
| 4,020,913 | 5/1977 | Tanigaichi et al. | 560/301 |
| 4,022,755 | 5/1977 | Tanigaichi et al. | 528/172 |
| 4,060,541 | 11/1977 | Sundermann | 560/301 |
| 4,116,946 | 9/1978 | Jakob et al. | 528/72 |
| 4,157,360 | 6/1979 | Prevorsek et al. | 528/165 |
| 4,170,711 | 10/1979 | Orlando et al. | 524/209 |
| 4,477,629 | 10/1984 | Hefner | 560/301 |
| 4,578,422 | 3/1986 | Sakurai et al. | 524/209 |

FOREIGN PATENT DOCUMENTS 1060933 3/1967 United Kingdom .
1305967 2/1973 United Kingdom .

Primary Examiner—Veronica P. Hoke
Attorney, Agent, or Firm—Browdy and Neimark

[57] ABSTRACT

A stabilized polyolefin resin composition in which (a) 0.005–5% by weight of at least one monofunctional or polyfunctional cyanate ester compound having at least one cyanato group in its molecule, (b) 0.01–5% by weight of at least one hindered amine ultraviolet absorber and (c) 0.005–2% by weight of at least one hindered phenolic antioxidant are incorporated into a polyolefin resin is disclosed. The resin composition has excellent heat stability and resistance to weathering.

11 Claims, No Drawings

POLYOLEFIN RESIN COMPOSITION

FIELD OF THE INVENTION

The present invention relates to a novel, stabilized polyolefin resin composition, and particularly relates to a polyolefin resin composition having excellent heat stability and resistance to weathering as a molding material. The present resin composition still exhibits excellent appearance, stability and rigidity even when it contains a filler etc.

BACKGROUND OF THE INVENTION

In the prior art, polyolefins have widely been utilized in a variety of industrial fields as general-purpose plastic resins. Polyolefins are likely to deteriorate in quality when they are exposed to ultraviolet light. Specifically, any inorganic fillers, metals, metal oxides or pigments present in polyolefins tend to accelerate such deterioration. In the prior art, stabilizers such as triazoles, tetrazoles, substituted hydrazines, malonic acid amide, oxalic acid amide, hindered phenols, and phosphites have been used for the purpose of preventing such deterioration.

Some of the present inventors previously found that such deterioration could be ameliorated by incorporating into thermoplastic resins a compound having one cyanato group (—OCN) (refer to U.S. Ser. No. 837,788 filed on Mar. 10, 1986 by Gaku et al). The present inventors found, however, that when cyanate ester monomer was used for preventing such deterioration of a thermoplastic resin, the monomer might bleed. For this reason we examined the possibility of finding a process capable of overcoming this bleeding problem as well as the problems of deterioration caused by such phenomena as exposure to ultraviolet light, heat decomposition, and contact with metals. This invention is based on and own discovery of a process capable of achieving this object.

SUMMARY OF THE INVENTION

This invention relates to a stabilized polyolefin resin composition in which (a) 0.005-5% by weight of at least one monofunctional or polyfunctional cyanate ester compound having at least one cyanato group in its molecule, (b) 0.01-5% by weight of at least one hindered amine ultraviolet absorber and (c) 0.005-2% by weight of at least one hindered phenolic antioxidant are incorporated into a polyolefin resin. According to the present invention, polyolefins containing an inorganic filler or a pigment may be stabilized by the above-mentioned process.

DETAILED DESCRIPTION OF THE INVENTION

Polyolefins (PO) which may be used in this invention include polyethylenes, such as low density polyethylene, medium-density polyethylene, high density polyethylene, linear low density polyethylene (LLDPE), low to high density polypropylene, polybutene-1, poly-4-methylpentene-1, ethylenepropylene copolymer, carboxylic acids such as acrylic acid or maleic acid-modified polyolefin, and mixtures of two or more of acrylic acid, maleic acid-modified polyolefins, polyolefins containing copolymeric rubber of ethylene or propylene and ethylene-propylene-diene rubber.

The polyolefins may contain, for the purpose of filling, strengthening or pigmenting, inorganic fillers, metals, metal oxides or pigments, as occasion demands.

The inorganic fillers that may be employed include, for example, powders of calcium carbonate, magnesium hydroxide, aluminum hydroxide, calcium hydroxide, gypsum, talc, clay, mica, glass or wallastonite, or fibrous whiskers or pieces. Suitably employed metals include, for example, powder, fibers or chips of copper, iron, cobalt, nickel, chrome, manganese, aluminum or alloys of those metals. Suitable metal oxides include, for example, powder, fibers or chips of copper oxides, iron oxides, antimony trioxide, diantimony pentoxide or lead oxides. The pigments that may be employed include, for example, organic metal compounds, such as copper phthalocyanine (phthalocyanine blue or green), chrome yellow, white lead, zinc white, loces, zinc chromate, mineral violet, carbon black, yellow iron oxide, red iron oxide, black iron oxide, ultramarine, chrome vermillion, chrome orange, invar steel, nickel titanate, mercuric sulfide, cobalt oxide, cobalt blue, cobalt violet, strontium chromate, molybdenum red, molybdenum white, charton white, cadmium yellow, titanium yellow, and titanium white.

Inorganic fillers, metals, metal oxides, and pigments may be added to the thermoplastic resins in conventionally employed amounts. In general, the amount of the inorganic fillers employed may be in the range of 5-70% by weight on the basis of the weight of the composition; and the amount of the pigments employed may be in the range of 0.001-5% by weight on the basis of the weight of the composition. Other additives which are normally used in conventional PO may be incorporated into the PO of this invention.

Monofunctional or polyfunctional cyanate ester compounds having at least one cyanato group in their molecules which may be employed as component (a) are represented by the formula:

$$R(OCN)_m \qquad (1)$$

wherein m is an integer of at least one, and preferably not more than 5; R is an aromatic organic group and the cyanato group or cyanate groups are bonded to the aromatic ring of the organic group.

Examples of these cyanate ester compounds include alkyl cyanato benzenes, such as monocyanato benzene and p-tert.-butyl cyanato benzene, monocyanato naphthalene, 1,3- or 1,4-dicyanato benzene, 1,3,5-tricyanatobenzene, 1,3-, 1,4-, 1,6-, 1,8-, 2,6- or 2,7-dicyanato naphthalene, 1,3,6-tricyanato naphthalene, 4,4'-dicyanato biphenyl, bis(4-dicyanatophenyl)methane, 2,2-bis(4-cyanatophenyl)propane, 2,2-bis(3,5-dichloro-4-cyanatophenyl)propane, 2,2-bis(3,5-dibrome-4-cyanatophenyl)propane, bis(4-cyanatophenyl)ether, bis(4-cyanatophenyl)thioether, bis(4-cyanatophenyl)sulfone, tris(4-cyanatophenyl)phosphate, and cyanate esters obtained by reacting a hydroxy-terminated polycarbonate oligomer with a cyanogen halide (U.S. Pat. No. 4,026,913) and cyanate esters obtained by reacting novolak with a cyanogen halide (U.S. Pat. Nos. 4,022,755 and 3,448,079). Other cyanate ester compounds are given in Japanese Patent Publication (Kokoku) Nos. 1928/1966; 18468/1968; 4791/1969; 11712/1970; 41112/1971 and 26853/1972 and Japanese Patent Publication (Kokai) No. 4149/1976 and U.S. Pat. Nos. 3,553,244; 3,755,403; 3,740,348; 3,595,900; 3,694,410 and 4,116,946 which are incorporated herein by reference.

Said U.S. Pat. Nos. 4,022,755 and 4,116,946 referred to above and incorporated by reference disclose monofunctional or polyfunctional cyanate ester monomers represented by formulas (1) and (2):

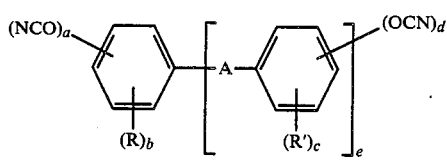
(1)

wherein R and R' which may be the same or different, represents hydrogen, halogen, linear or branched $C_1$–$C_9$ alkyl; A is a $C_1$–$C_9$ alkylene group; a is a number from 0 to 5 where $e=1$ and a number from 2 to 5 where $e=0$; $b=5-a$ where $e=1$ and $6-(a+d)$ where $e=0$; $c=5-d$; d is a number from 0 to 5; e is a number 0, 1, 2 or 3; with the proviso that the sum of $(a+d)$ always gives a number from 2 to 5,

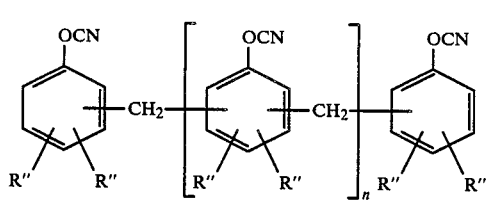
(2)

wherein n is 0 or an integer of 1 or more; and R"s may be the same or different, and each R" is hydrogen or methyl. According to U.S. Pat. No. 4,022,755 there must be at least 50% by weight or more in total of polymers having formula (2) in which n is an integer of 1-3.

The above polyfunctional cyanate ester can be used as it is, or a prepolymer having a cyanato group or cyanato groups in its molecule obtained by polymerizing the above polyfunctional cyanate ester in the presence or absence of a mineral acid, Lewis acid, a salt such as sodium carbonate or lithium chloride, a phosphate such as tributyl phosphine, or an organic metal salt at an elevated temperature can be used, or a preliminary reaction of the above polyfunctional cyanate ester with a monofunctional or polyfunctional maleimide as explained in the following can also be used.

The hindered amine ultraviolet absorbers which are employed as component (b) are compounds having a hindered amino group in their molecules and which exhibit the capability to prevent deterioration by light of the PO. These compounds have a groups represented by the formulae:

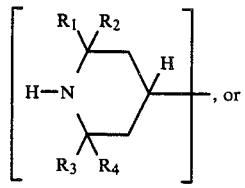
(2)

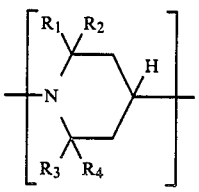
(3)

wherein each of $R_1$, $R_2$, $R_3$ and $R_4$ is independently lower alkyl of 1-3 carbon atoms. The compounds may be obtaining by reacting a dibasic acid, such as sebacic acid or adipic acid, or a polyamine, such as hexamethylene diamine, melamine, etc., with a piperidine having alkyl groups on 2,6-positions thereof. Concretely, components (b) include, for example, a compound having two groups represented by formula (2) (for example, TINUVIN 770 etc.), a compound having three or more groups represented by formula (2) and a molecular weight of about 2,000about 5,000 (for example, trade name CHIMASSORB 944-LD CHIMASSORB 944, etc.), and a compound having three or more groups represented by formula (3) having a molecular weight of about 2,000–about 5,000 (for example, TINUVIN 622, etc.) The compounds having one or more groups of formula (2) are preferable. Particularly, compounds having groups of formula (2) and a molecular weight of about 2,000–about 5,000 are most preferable. Other ultraviolet absorbers, such as benzotriazoles, etc. may be used with the above absorbers.

The hindered phenolic antioxidants which may be employed as component (c) are compounds having a hindered phenol group in their molecules and which exhibit the capability to prevent oxidative decomposition at room temperature or elevated temperatures. Concretely, preferable antioxidants include, 3,5-di-tert.-butyl-4-hydroxytoluene (BHT, BHT SWANOX), 44'-thiobis-(6-tert.-butyl-3-methylphenol) (YOSHINOX SR), pentaerythritoltetrakis (3-(3,5-di-tertiary-butyl-4-hydroxyphenyl)propionate (IRGANOX 1010). YOSHINOX SR is most preferable.

When the above-mentioned components (a), (b) and (c) are incorporated into a PO, bleeding of the cyanate ester monomer is prevented and polyolefin compositions having excellent thermal resistance and resistance to weathering can be obtained.

The amount of component (a) employed is in the range of 0.005-5% by weight, preferably 0.02-2% by weight. The amount of component (b) employed is in the range of 0.01-5% by weight, preferably 0.1-2% by weight. More preferably, component (b) is used in an amount of at least 0.5 times that of component (a), and most preferably in an amount of at least 1.0 times that of component (a). The amount of component (c) employed is in the range of 0.005-2% by weight, preferably 0.03-0.5% by weight.

When component (a) is used in an amount of less than 0.005% by weight, the heat stability of the polyolefin is not sufficiently improved. When component (a) is used in an amount more than 5% by weight, the oxidation starting time may be shortened.

When component (b) is used in an amount of less than 0.01% by weight, the ultraviolet resistance of the PO is not sufficiently improved. When component (b) is used in an amount of more than 5% by weight, the cost is unnecessarily increased. When component (b) is used in an amount of at least 0.5 times and preferably at least 1.0 times that of component (a), bleeding of the cyanate ester monomer can be prevented completely.

When component (c) is used in an amount of less than 0.005% by weight, the oxidative deterioration of the PO cannot be sufficiently ameliorated. When component (c) is used in an amount of more than 2% by weight, the cost is unnecessarily increased.

Any method capable of uniformly blending PO with components (a), (b) and (c) may be used for mixing them. When fibrous fillers are used as a reinforcing material, they must be mixed under conditions that will ensure that the fibrous fillers are not broken. In general, a method comprising blending them with a blender and then forming pellets with an extruder; a method comprising mixing PO with components (a)–(c) in the form of a solution and then drying the solution; or a method comprising mixing them with a kneader or Henschel mixer and then forming pellets by means of an extruder can be used. In case of preparing PO compositions containing inorganic fillers, pigments, metals and/or metal oxides, a method that may be suitably employed comprises mixing the cyanate ester compounds (component (a)) with the inorganic fillers, pigments, metals and/or metal oxides, and optionally heating the mixture to form a semicured or cured membrane of the cyanate ester on the surface of the additives, and then mixing the mixture with the thermoplastic resin and forming the pellets with an extruder; alternatively a master batch method comprising forming a master batch in a high concentration and mixing the master batch with a plain PO can be used. The PO can be blended with the other components with a conventional extruder at room temperature or at a high temperature. It is preferable that the blending is carried out within a short time.

The present invention is further illustrated by the following non-limiting Examples and Comparative Runs.

All percentages and parts in these Examples and Comparative Runs are by weight, unless otherwise specified.

EXAMPLE 1

To polypropylene (100 parts) were added 2,2-bis(4-cyanatophenyl)propane (hereinunder referred to as BPA-CN) (1 part), hindered amine ultraviolet absorber (trade name CHIMASSORB 944-LD, Sankyo Co., Ltd.) (1 part), hindered phenolic antioxidant (trade name IRGANOX 1010 (pentaerythritoltetrakis(3-(3,5-di-tert.-butyl-4-hydroxyphenyl)propionate)) (Ciba-Geigy) and trade name BHT SWANOX) (1 part). They were blended by Henschel mixer and formed into pellets by a 40 mm0 vent extruder at 230° C. Samples for the tests were prepared from the pellets directly, or by injection-molding the pellets. The test results are shown in Table 1.

Comparative Run 1

The procedure of Example 1 was repeated except that CHIMASSORB 944-LD was not used. The test results are shown in Table 1.

EXAMPLE 2

The procedure of Example 1 was repeated except that polypropylene (100 parts) BPA-CN (0.1 part), CHIMASSORB 944-Ld (0.1 part), hindered phenolic antioxidant (YOSHINOX SR) (0.2 parts) and phthalocyanine blue (pigment) (2 parts) were used. The test results are shown in Table 1.

Comparative Runs 2–4

The procedures of Example 2 were repeated except that each of BPA-CN (Comparative Run 2), CHIMASSORB 944-LD (Comparative Run 3) and YOSHINOX (Comparative Run 4) was not used. The test results are shown in Table 1.

TABLE 1

|  | Ex. 1 | Comp. Run 1 | Ex. 2 | Comp. Run 2 | Comp. Run 3 | Comp. Run 4 |
| --- | --- | --- | --- | --- | --- | --- |
| polypropylene | 100 | 100 | 100 | 100 | 100 | 100 |
| BPA-CN | 1 | 1 | 0.1 |  | 0.1 | 0.1 |
| CHIMASSORB | 2 |  | 0.1 | 0.1 |  | 0.1 |
| IRGANOX 101 | 0.1 | 0.1 |  |  |  |  |
| BHT SWANOX | 0.1 | 0.1 |  |  |  |  |
| YOSHINOX SR |  |  | 0.2 | 0.2 | 0.2 |  |
| phthalocyanine blue |  |  | 2 | 2 | 2 | 2 |
| bleed (*1) | O | X | O | O | X | O |
| thermal resistance (*2) | O | X | O | O | X | O |
| weathering (*3) | O | X | O | O | X | O |
| oxygen absorption induction time (*4) | — | — | 72 min. | 44 min. | 70 min. | 48 min. |
| oxidative decomposition starting time (*5) | — | — | 248° C. | 245° C. | 246° C. | 235° C. |

Bleed test (*1):
Each of the pellets and the sheets molded therefrom were placed on an aluminum foil, a steel plate or a stainless steel plate and left to stand in a gear oven (120° C.) for 2 hours. The bleeding that occurred in the foil, steel sheet or stainless sheet was evaluated visually. The criteria for evaluation were as follows: O, no detectable bleeding occurred; Δ, slight bleeding occurred; X, extensive bleeding occurred.

Heat resistance test (*2):
Pellets were fed into an injection molding machine (in-line screw type; clamping force, 100 tons) and, after being retained in the cylinder at 280° C. for 10 or 20 minutes, the pellets were subjected to injection molding. The change in sample color (ΔE) from that of the samples that were injection-molded without being retained in the cylinder was measured. The criteria for evaluation were as follows: O, ΔE being less than 1; Δ, ΔE being 1–2; X, ΔE being more than 2.

Weathering test (*3):
The injection-molded sheets were exposed to light in a Sunshine-Fedeometer Type HAL-3 of Suga Testing Instruments Co., Ltd. at 100-hr intervals for a total exposure time of 500 hours. The change in sample color from that of unirradiated samples was measured. The criteria for evaluation were as follows: O, ΔE being less than 1; Δ, ΔE being 1–2; X, ΔE being more than 2.

Oxygen absorption induction time (*4):
Half a gram of the sample was heated in a methyl benzoate vapor bath (199.5° C.) in an oxygen atmosphere at one pressure. The time required for polypropylene to be deteriorated oxidatively, react with oxygen and to start to absorb it was measured and indicated as the oxygen absorption induction time. The longer this time, the more resistant to oxidative deterioration the sample is.

Oxidative decomposition starting time (*5):
In differential thermal analysis (DTA), the sample was heated at a constant rate (10° C./min) in the air and the temperature at which an exothermic peak due to oxidative decomposition of the sample appeared on the DTA curve was indicated as the oxidative decomposition starting time.

It is clear from Table 1 that hindered amine ultraviolet absorber not only prevents bleeding of BPA-CN, but also improves thermal resistance and resistance to weather of PO.

It is also clear from Table 1 that when BPA-CN is combined with YOSHINOX SR, oxygen absorption induction time is prolonged and harmfulness by copper can be prevented.

EXAMPLE 3

Procedure of Example 1 was repeated except that polypropylene (70 parts), gypsum fiber (30 parts), BPA-CN (1 part), CHIMASSORB 944-LD (1 part), IRGANOX 1010 (0.1 part) and BHT SWANOX (0.1 part) were used. The test results are shown in Table 2.

Comparative Run 5

The procedure of Example 3 was repeated except that CHIMASSORB 944-LD was not used. The test results are shown in Table 2.

It is clear from Table 2 that even when BPA-CN, hindered amine ultraviolet absorber and hindered phenolic antioxidant were incorporated into gypsum fiber-containing polypropylene, striking effect can be obtained.

TABLE 2

|                      | Ex. 3 | Comp. Run 5 |
|----------------------|-------|-------------|
| bleed (*1)           | O     | X           |
| thermal resistance (*2) | O   | Δ           |
| weathering (*3)      | O     | Δ           |

EXAMPLES 4-5

To powdered polypropylene (MI=4) were added α-hemihydrate gypsum fiber having diameter of 2 μm and length of 50-60 μm, BPA-CN, CHIMASSORB 944-LD and hindered phenolic antioxidant (IRGANOX 1010 and BHT SWANOX) (costabilizer) as shown in Table 3. They were mixed by Henschel mixer and pelletized by vent screw type extruder of 40 mm$\phi$ at 250° C.

The test samples were prepared by injection-molding the pellets. The test results are shown in Table 3.

Comparative Runs 6-7

The procedures of Example 4 were repeated except that CHIMASSORB 944-LD (Comparative Run 6) or CHIMASSORB 944-LD and BPA-CN (Comparative Run 7) was not used. The test results are shown in Table 3.

Comparative Run 8

The procedure of Comparative Run 7 was repeated except that polypropylene (58 parts), acrylic acid-modified polypropylene (12 parts) and α-hemihydrate gypsum (30 parts) were used. The test results are shown in Table 3.

Comparative Runs 9-10

The procedures of Example 5 were repeated except that CHIMASSORB 944-LD (Comparative Run 9) and CHIMASSORB 944-LD and BPA-CN (Comparative Run 10) was not used. The test results are shown in Table 3.

The physical properties of Table 3 were measured in the following:

Tensile strength, elongation: ASTM D 638, autograph DSC-2000, ASTM-I type sample, tensile speed 50 mm/min.

Flexural strength flexural modulus: ASTM-D 790, autograph DSC-2000 bending speed 2.5 mm/min.

Izot impact value: notched thickness 3.2 mm

Mold shrinkage factor: ½ inch (width)×¼ inch (thickness)×5 inch (length) sample was measured in lengthwise direction.

Heat distortion temperature: ASTM D 648, Load 18.6 kg/cm$^2$

Aging time: 5 cm×9 cm×2 mm (thickness) sample was set in gear oven maintained at 150° C., and time was measured until crack of the sample is caused.

Appearance: State of sample observed by naked eye.

TABLE 3

|  | Ex. 4 | Comp. Run 6 | Comp. Run 7 | Comp. Run 8 | Ex. 5 | Comp. Run 9 | Comp. Run 10 |
|---|---|---|---|---|---|---|---|
| polypropylene | 70 | 70 | 58 | 58 | 64 | 64 | 64 |
| acrylic acid modified polypropylene | 0 | 0 | 12 | 12 | 0 | 0 | 0 |
| α-hemigypsum fiber | 30 | 30 | 30 | 30 | 35 | 35 | 35 |
| II type anhydrous gypsum fiber |  |  |  |  |  |  |  |
| II type anhydrous gypsum powder |  |  |  |  |  |  |  |
| BPA-CN | 1 | 1 | 0 | 0 | 1 | 1 | 0 |
| CHIMASSORB 944-LD | 1 | 0 | 0 | 0 | 1 | 0 | 0 |
| IRGANOX 1010 | 0.1 | 0.1 | 0.1 | 0.1 | 0.1 | 0.1 | 0.1 |
| BHT SWANOX | 0.1 | 0.1 | 0.1 | 0.1 | 0.1 | 0.1 | 0.1 |
| tensile strength at yield point kg/mm$^2$ | 3.90 | 3.90 | 3.60 | 3.95 | 3.30 | 3.30 | 2.90 |
| tensile break strength kg/mm$^2$ | 3.40 | 3.35 | 2.85 | 3.65 | 2.95 | 2.90 | 1.95 |
| flexural strength kg/mm$^2$ | 5.95 | 5.95 | 5.50 | 6.10 | 5.65 | 5.60 | 4.65 |
| flexural modulus kg/mm$^2$ | 410 | 410 | 336 | 352 | 420 | 420 | 340 |
| Izot impact strength kg cm/cm | 3.6 | 3.6 | 4.2 | 3.3 | 2.9 | 2.9 | 3.5 |
| mold shrinkage factor % | 1.35 | 1.35 | 1.55 | 1.65 | 1.25 | 1.25 | 1.55 |
| aging time (at 150° C.) hrs. | 150 | 150 | 70 | 80 | 120 | 120 | 60 |
| appearance |  |  |  |  |  |  |  |
| state of surface | good, with some improvement in whiteness | same as the left | good | good | good, with some improvement in whiteness | same as the left | good |
| bleed *1 | O | X | O | O | O | X | O |
| thermal resistance *2 | O | X | O | O | O | X | O |
| weathering *3 | O | X | X | X | O | X | X |

EXAMPLE 6

The procedure of Example 4 was repeated except that II type anhydrous gypsum fiber having a diameter of 2 μm and length of 50-60 μm was used as gypsum fiber. The test results are shown in Table 4.

Comparative Runs 11-12

The procedures of Example 6 were repeated except that CHIMASSORB 944-LD (Comparative Run 11) or CHIMASSORB 944-LD and BPA-CN (Comparative Run 12) was not used. The test results are shown in Table 4.

Comparative Run 13

The procedure of Comparative Run 8 was repeated except that II type anhydrous gypsum fiber having diameter of 2 μm and length of 50–60 μm was used as a gypsum fiber. The test results are shown in Table 4.

Comparative Run 14

The procedure of Comparative Run 13 was repeated except that II type anhydrous gypsum powder (30 parts) was used.

EXAMPLE 8

To polypropylene powder (MI=4) were added muscovite mica having average particle size of 20 μm and aspect ratio of 20, BPA-CN, CHIMASSORB 944-LD, and BHT (3,5-di-tert.-butyl-4-hydroxytoluene) (0.1

TABLE 4

|  | Ex. 6 | Comp. Run 11 | Comp. Run 12 | Comp. Run 13 | Comp. Run 14 |
|---|---|---|---|---|---|
| polypropylene | 70 | 70 | 70 | 58 | 58 |
| acrylic acid modified polypropylene | 0 | 0 | 0 | 12 | 12 |
| α-hemigypsum fiber | | | | | |
| II type anhydrous gypsum fiber | 30 | 30 | 30 | 30 | |
| II type anhydrous gypsum powder | | | | | 30 |
| BPA-CN | 1 | 1 | 0 | 0 | 0 |
| CHIMASSORB 944-LD | 1 | 0 | 0 | 0 | 0 |
| IRGANOX 1010 | 0.1 | 0.1 | 0.1 | 0.1 | 0.1 |
| BHT SWANOX | 0.1 | 0.1 | 0.1 | 0.1 | 0.1 |
| tensile strength at yield point kg/mm$^2$ | 3.50 | 3.45 | 3.35 | 3.60 | 3.10 |
| tensile break strength kg/mm$^2$ | 3.30 | 3.30 | 2.50 | 3.40 | 2.70 |
| flexural strength kg/mm$^2$ | 5.85 | 5.80 | 5.80 | 6.20 | 4.90 |
| flexural modulus kg/mm$^2$ | 400 | 400 | 350 | 380 | 230 |
| Izot impact strength kg cm/cm | 2.9 | 2.9 | 2.9 | 2.9 | 2.5 |
| mold shrinkage factor % | 1.35 | 1.35 | 1.55 | 1.40 | 1.68 |
| aging time hrs. | 200 | 200 | 110 | 120 | 130 |
| appearance | | | | | |
| state of surface | good, with some improvement in whiteness | same as the left | good | good | good |
| bleed *1 | O | X | O | O | O |
| thermal resistance *2 | O | X | O | O | O |
| weathering *3 | O | X | X | X | X |

EXAMPLE 7

To polyethylene powder (MI=5) (70 parts) were added α-hemihydrate gypsum fiber (30 parts) having diameter of 2 μm and length of 50–60 μm, BPA-CN (1 part), CHIMASSORB (0.1 part), IRGANOX 1010 (0.1 part) and BHT SWANOX (0.1 part). They were mixed by Henschel mixer and pelletized by bent screw extruder 40 mmφ at 250° C. The test samples were prepared by injection-molding the pellets. The test results are shown in Table 5.

Comparative Runs 15–16

The procedures of Example 7 were repeated except that CHIMASSORB 944-LD (Comparative Run 15) or CHIMASSORB 944-LD and BPA-CN (Comparative Run 16) was not used. The test results are shown in Table 5.

TABLE 5

|  |  | Ex. 7 | Comp. Run 15 | Comp. Run 16 |
|---|---|---|---|---|
| tensile strength at yield point | kg/mm$^2$ | 3.35 | 3.33 | 2.68 |
| tensile break strength | " | 2.80 | 2.79 | 2.35 |
| elongation | % | 30 | 30 | 22 |
| flexural strength | kg/mm$^2$ | 3.85 | 3.82 | 3.41 |
| flexural modulus | " | 240 | 240 | 210 |
| Izot impact strength | kg cm/cm | 4.5 | 4.5 | 3.9 |
| mold shrinkage factor in lengthwise direction | | 1.40 | 1.40 | 1.42 |
| appearance | | good, smooth | good, smooth | good, smooth |
| bleed *1 | | O | X | O |
| thermal resistance *2 | | O | X | O |
| weathering *3 | | O | O | X | part) and IRGANOX 1010 (0.1 part) (co-stabilizer) as shown in Table 6. They were mixed by Henschel mixer, and pelletized by bent screw extruder 40 mmφ at 220° C.

The test samples were prepared by injection-molding the pellets. The test results are shown in Table 6.

Comparative Runs 17–18

The procedures of Example 8 were repeated except that CHIMASSORB 944-LD (Comparative Run 17) or CHIMASSORB 944-LD and BPA-CN (Comparative Run 18) was not used. The results are shown in Table 6.

Comparative Run 19

The procedure of Comparative Run 18 was repeated except that polypropylene (58 parts), acrylic acid-modified polypropylene (12 parts) and muscovite mica (30 parts) of Example 8 were used. The test results are shown in Table 6.

EXAMPLE 9

The procedure of Example 8 was repeated except that phlogopite mica having average particle size of 20 μm and aspect ratio of 30 was used. The test results are shown in Table 6.

Comparative Runs 20–21

The procedures of Example 9 were repeated except that CHIMASSORB 944-LD (Comparative Run 20) or CHIMASSORB 944-LD and BPA-CN (Comparative Run 21) was not used. The results are shown in Table 6.

Comparative Run 22

The procedure of Comparative Run 20 was repeated except that polypropylene (58 parts), acrylic acid-modified polypropylene (12 parts) and phlogopite mica (30 parts) of Example 9 were used. The test results are shown in Table 6.

TABLE 6

|  | Ex. 8 | Comp. Run 17 | Comp. Run 18 | Comp. Run 19 | Ex. 9 | Comp. Run 20 | Comp. Run 21 | Comp. Run 22 |
|---|---|---|---|---|---|---|---|---|
| polypropylene | 70 | 70 | 70 | 58 | 70 | 70 | 70 | 58 |
| acrylic acid-modified polypropylene |  |  |  | 12 |  |  |  | 12 |
| muscovite mica | 30 | 30 | 30 | 30 |  |  |  |  |
| phlogopite mica |  |  |  |  | 30 | 30 | 30 | 30 |
| BPA-CN | 1 | 1 | 0 | 0 | 1 | 1 | 0 | 0 |
| CHIMASSORB 944-LD | 1 | 0 | 0 | 0 | 1 | 0 | 0 | 0 |
| stabilizer | 0.2 | 0.2 | 0.2 | 0.2 | 0.2 | 0.2 | 0.2 | 0.2 |
| tensile strength at yield point kg/mm$^2$ | 4.15 | 4.15 | 3.70 | 4.10 | 4.26 | 4.25 | 3.75 | 4.20 |
| tensile break strength kg/mm$^2$ | 3.75 | 3.75 | 3.20 | 3.80 | 3.95 | 3.95 | 3.30 | 3.90 |
| flexural strength kg/mm$^2$ | 6.55 | 6.50 | 5.90 | 6.40 | 6.75 | 6.70 | 5.95 | 6.60 |
| flexural modulus kg/mm$^2$ | 520 | 520 | 420 | 470 | 565 | 560 | 425 | 480 |
| mold shrinkage factor in lengthwise direction % | 1.30 | 1.30 | 1.40 | 1.36 | 1.20 | 1.20 | 1.35 | 1.25 |
| aging time hrs. | 300 | 300 | 45 | 250 | 300 | 300 | 45 | 250 |
| appearance of molding | good and smooth | | | | | | | |
| bleed *1 | O | X | O | O | O | X | O | O |
| thermal resistance *2 | O | X | O | O | O | X | O | O |
| weathering *3 | O | X | X | X | O | X | X | X |

EXAMPLE 10

To polyethylene powder (MI=5) (70 parts) were added muscovite mica (30 parts) having average particle size of 20 μm and aspect ratio of 20, BPA-CN (2 parts), CHIMASSORB 944-LD (1 part) and co-stabilizer (0.2 parts) of Example 8. They were mixed by Henschel mixer and pelletized by bent screw extruder 40 mmΦ at 220° C. The test samples were prepared by injection-molding the pellets. The test results are shown in Table 7.

Comparative Runs 23-24

The procedures of Example 10 were repeated except that CHIMASSORB 944-LD (Comparative Run 23) or CHIMASSORB 944-LD and BPA-CN (Comparative Run 24) was not used. The test results are shown in Table 7.

TABLE 7

|  | Ex. 10 | Comp. Run 23 | Comp. Run 24 |
|---|---|---|---|
| MPR g/10 min | 2.1 | 2.1 | 7.6 |
| density g/cm$^3$ | 1.19 | 1.19 | 1.18 |
| tensile strength at yield point kg/mm$^2$ | 3.95 | 3.94 | 2.97 |
| tensile break strength kg/mm$^2$ | 3.55 | 3.56 | 2.85 |
| tensile break elongation, % | 28 | 27 | 12 |
| flexural strength kg/mm$^2$ | 5.00 | 5.02 | 3.97 |
| flexural modulus kg/mm$^2$ | 305 | 300 | 285 |
| Izot impact strength kg cm/cm | 4.7 | 4.7 | 3.3 |
| Shore hardness D | 74.1 | 74.0 | 71.6 |
| mold shrinkage factor in lengthwise direction % | 1.64 | 1.65 | 1.60 |
| heat distortion temperature °C. | 83 | 83 | 71 |
| appearance of molding | good | good | good |
| bleeding *1 | O | X | O |
| thermal resistance *2 | O | X | O |
| weathering *3 | O | X | X |

The above experiments reveal in the following:

Cyanate ester compound strikingly improves tensile break strength, flexural strength and flexural modulus of polyolefins containing fillers, etc. The compound improves mold shrinkage factor and heat aging property of polyolefin moldings.

However, only cyanate ester compound is added to polyolefins, the compound bleeds the polyolefins, and thermal resistance and resistance to weather of polyolefins are not sufficiently improved. When a hindered amine ultraviolet absorber and optionally a hindered phenolic antioxidant are added to polyolefins with a cyanate ester compound, bleeding problem can be solved and deterioration by ultraviolet, thermal decomposition, oxidative deterioration and deterioration by contact with metal of polyolefins can be improved to considerable extent. The polyolefins containing these components can widely be used in industrial fields.

What is claimed is:

1. A stabilized polyolefin resin composition comprising a polyolefin resin having incorporated therein
   (a) 0.005–5% by weight of at least one monofunctional or polyfunctional cyanate ester represented by the formula (1) or (2):

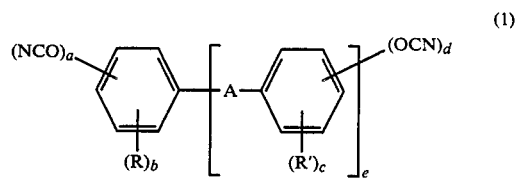

wherein R and R', which may be the same or different, represents hydrogen, halogen, linear or branched $C_1$–$C_9$ alkyl; A is a $C_1$–$C_9$ alkylene group; a is a number from 0 to 5 wherein e=1 and a number from 2 to 5 where e=0; b=5−a where e=1 and 6−(a+d) where e=0; c=5−d; d is a number from 0 to 5; e is a number 0, 1, 2 or 3; with the proviso that the sum of (a+d) always gives a number from 2 to 5,

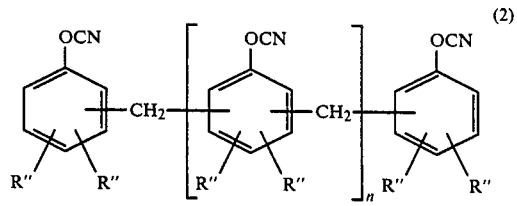

wherein n is 0 or an integer of 1 or more; and R"s may be the same or different, and each R" is hydrogen or methyl; and wherein of formula (2) there contains 50% by weight or more in total of cyanate esters in which n is an integer of 1 to 3,
  (b) 0.01-5% by weight of at least one hindered amine ultraviolet absorber and
  (c) 0.005-2% by weight of at least one hindered phenolic antioxidant.

2. The composition of claim 1 wherein the amount of component (a) is in the range of 0.02-2% by weight.

3. The composition of claim 1 wherein said component (a) is selected from the group consisting of bis(4-dicyanatophenyl)-methane, 2,2-bis(4-cyanatophenyl)-propane, 2,2-bis(3,5-dichloro-4-cyanatophenyl)propane, 2,2-bis(3,5-dibromo-4-cyanatophenyl) propane and cyanate esters obtained by reacting novalak with a cyanogen halide.

4. The composition of claim 1 wherein the amount of component (a) is in the range of 0.1-2% by weight.

5. The composition of claim 1 wherein said component (b) is used in an amount of at least 0.5 times that of said component (a).

6. The composition of claim 1 wherein said component (b) is obtained by reacting sebacic acid, adipic acid, or hexamethylene diamine or melamine with a piperidine having lower alkyl groups of 1-3 carbon atoms at its 2,6-positions.

7. The composition of claim 1 wherein the amount of component (c) is in the range of 0.03-0.5% by weight.

8. A stabilized olefin resin composition comprising a polyolefin resin having incorporated therein
  (a) 0.005-5% by weight of at least one monofunctional or polyfunctional cyanate ester selected from the group consisting of monocyanato benzene and p-tert.butyl cyanato benzene; monocyanato naphthalene; ,1,3- or 1,4-dicyanato benzene; 1,3,5-tricyanatobenzene; 1,3-, 1,4-, 1,6-, 1,8-, 2,6,- or 2,7-dicyanato nephthalene; 1,3,6-tricyanato naphthalene; 4,4'-dicyanato biphenyl; bis(4-dicyanatophenyl) methane; 2,2-bis(4-cyanatophenyl) propane; 2,2-bis(3,5-dichloro-4-cyanatophenyl) propane; 2,2-bis(3,5-dibromo-4-cyanatophenyl) propane; bis(4-cyanatophenyl) ether; bis(4-cyanatophenyl) thioether; bis(4-cyanatophenyl) sulfone; tris(4-cyanatophenyl) phosphate and cyanate esters obtained by reacting a hydroxy-terminated polycarbonate oligomer with a cyanogen halide and cyanate esters obtained by reacting novolak with a cyanogen halide;
  (b) 0.01-5% by weight of at least one hindered amine ultraviolet absorber; and
  (c) 0.005-2% by weight of at least one hindered phenolic antioxidant.

9. A composition in accordance with claim 8 wherein said cyanate ester is bis(4-dicyanatophenyl) methane; 2,2-bis(4-cyanatophenyl) propane; 2,2-bis(3,5-dichloro-4-cyanatophenyl) propane or 2,2-bis(3,5-dibromo-4-cyanatophenyl) propane.

10. The composition of claim 1 wherein said absorber is selected from compounds having at least one group represented by the formulae:

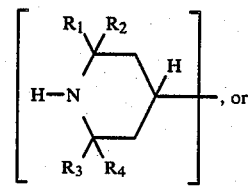

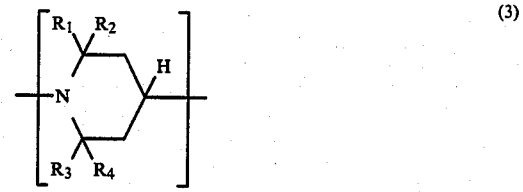

wherein each of $R_1$, $R_2$, $R_3$ and $R_4$ is independently lower alkyl of 1-3 carbon atoms.

11. The composition of claim 1 wherein the composition further contains one or more of an organic filler, a metal, a metal oxide and a pigment.

* * * * *